United States Patent
Bruvry et al.

(10) Patent No.: US 6,568,713 B1
(45) Date of Patent: May 27, 2003

(54) LIQUID DISTRIBUTION COLLECTOR MODULE AND FIXING SYSTEM FOR SAID MODULES

(75) Inventors: Michel Bruvry, Hautvilliers (FR); Philippe Didier, Abbeville (FR); Jacky Leger, Neuilly l'Hopital (FR)

(73) Assignee: Comap Abbeville SA, Abbeville (FR)

(*) Notice: Subject to any disclaimer, the term of this patent is extended or adjusted under 35 U.S.C. 154(b) by 0 days.

(21) Appl. No.: 09/979,111

(22) PCT Filed: May 12, 2000

(86) PCT No.: PCT/FR00/01296

§ 371 (c)(1),
(2), (4) Date: Dec. 10, 2001

(87) PCT Pub. No.: WO00/71924

PCT Pub. Date: Nov. 30, 2000

(30) Foreign Application Priority Data

May 20, 1999 (FR) .............................................. 99 06597

(51) Int. Cl.[7] .............................................. F16L 35/00
(52) U.S. Cl. .................................. 285/133.21; 285/313
(58) Field of Search ....................... 285/133.11, 133.21, 285/133.3, 305, 306, 313, 374

(56) References Cited

U.S. PATENT DOCUMENTS

| | | | | |
|---|---|---|---|---|
| 3,506,029 A | * | 4/1970 | Demler et al. | 285/133.21 |
| 3,538,940 A | * | 11/1970 | Graham | 137/271 |
| 3,542,403 A | | 11/1970 | Douglas | |
| 4,070,045 A | * | 1/1978 | Colter et al. | 285/325 |
| 4,076,279 A | | 2/1978 | Klotz et al. | |
| 4,524,807 A | * | 6/1985 | Toliusis | 137/884 |
| 4,782,852 A | * | 11/1988 | Legris | 137/269 |
| 5,390,638 A | * | 2/1995 | Hornby et al. | 123/456 |

FOREIGN PATENT DOCUMENTS

| | | |
|---|---|---|
| FR | 1 468 174 A | 2/1967 |
| FR | 2 325 874 A | 4/1977 |

* cited by examiner

*Primary Examiner*—John Fox
(74) *Attorney, Agent, or Firm*—Oliff & Berridge, PLC

(57) ABSTRACT

The module (2) comprises a tubular body (8) extending along a first axis (10) with at least one radial outlet (12). The module (2) has a female end-piece (16) at one extremity and a corresponding male end-piece (14) at the other. Bore holes (22, 28) extending along a plane which is substantially perpendicular to the first axis are provided on both sides of the module (2) at each of the ends thereof. When two modules (2) are fitted into each other, the bore holes (22) of one module are aligned with the bore holes (28) of the other module on both sides of the unit thus created. When the bore holes are parallel, adjacent modules are fixed by means of a U-shaped bracket whereby the branches thereof are placed in the aligned bore holes.

10 Claims, 3 Drawing Sheets

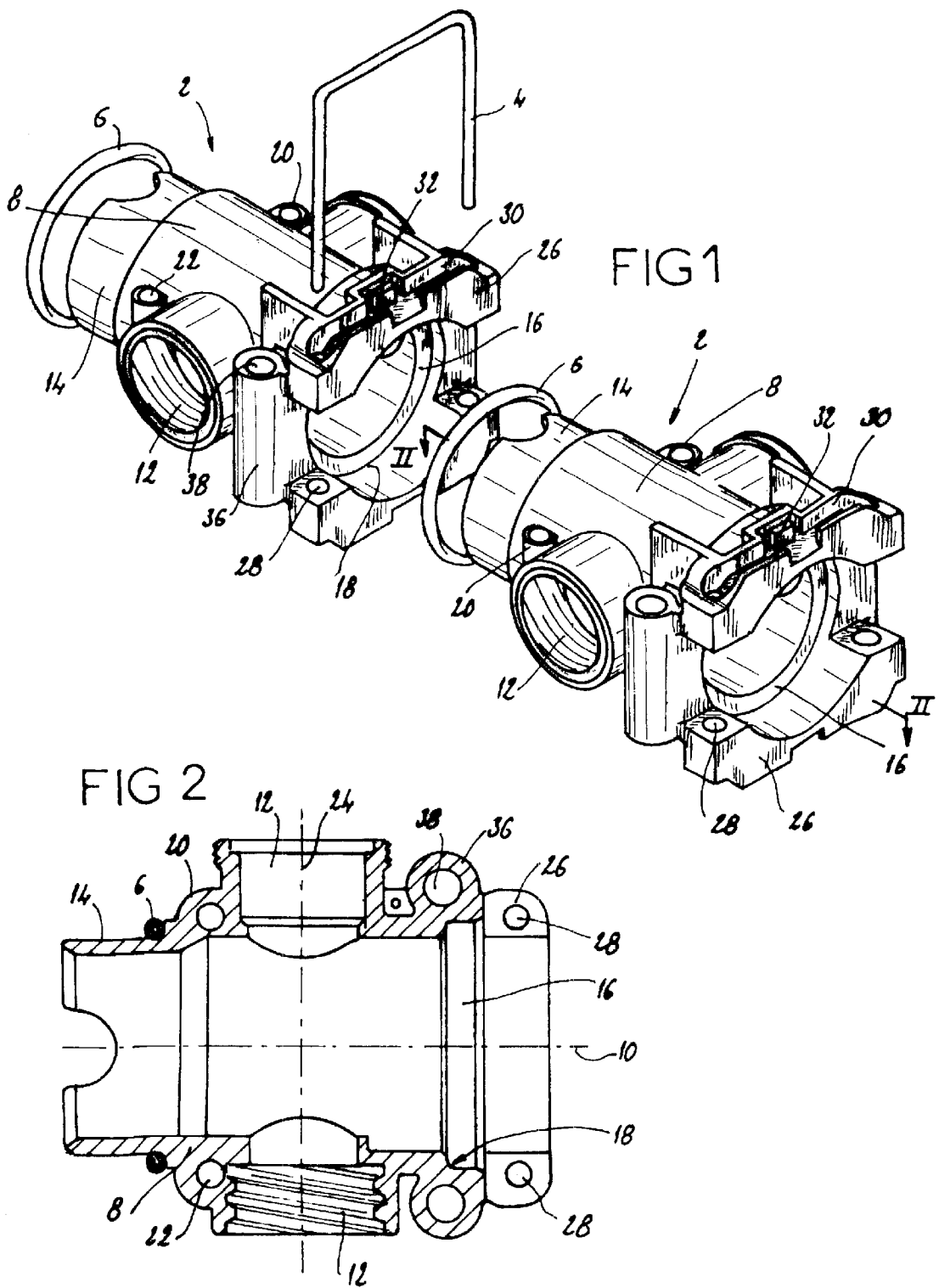

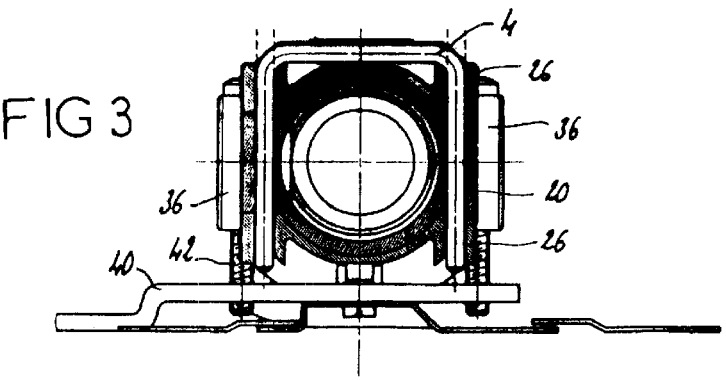
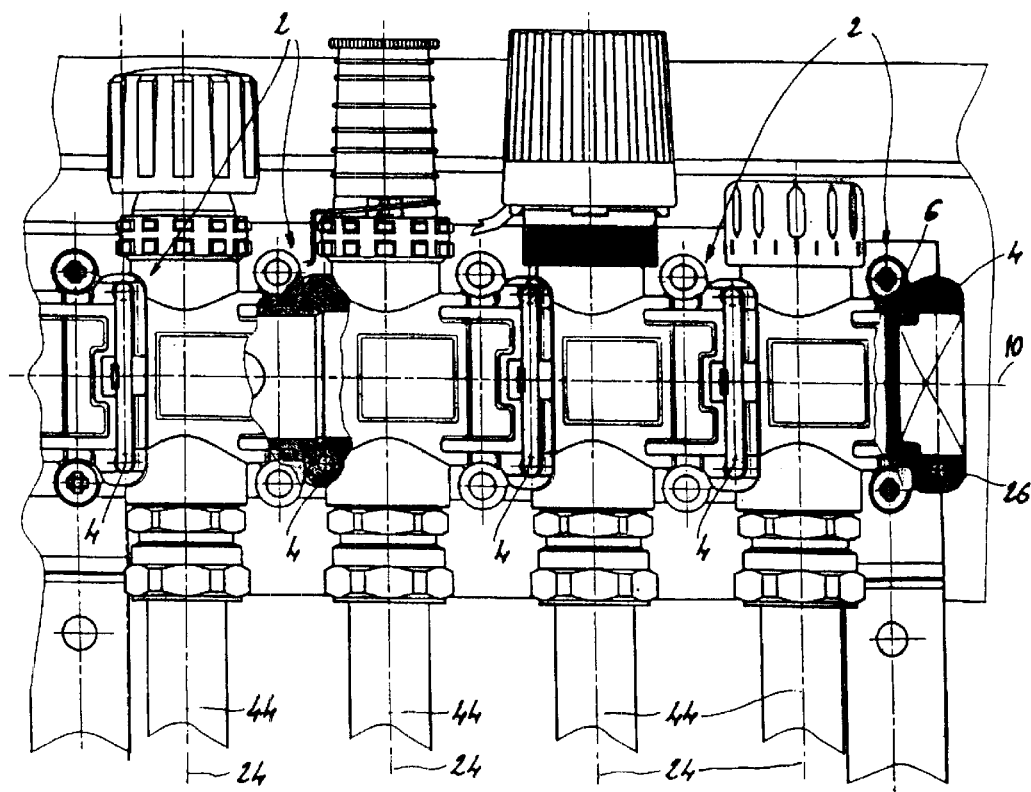

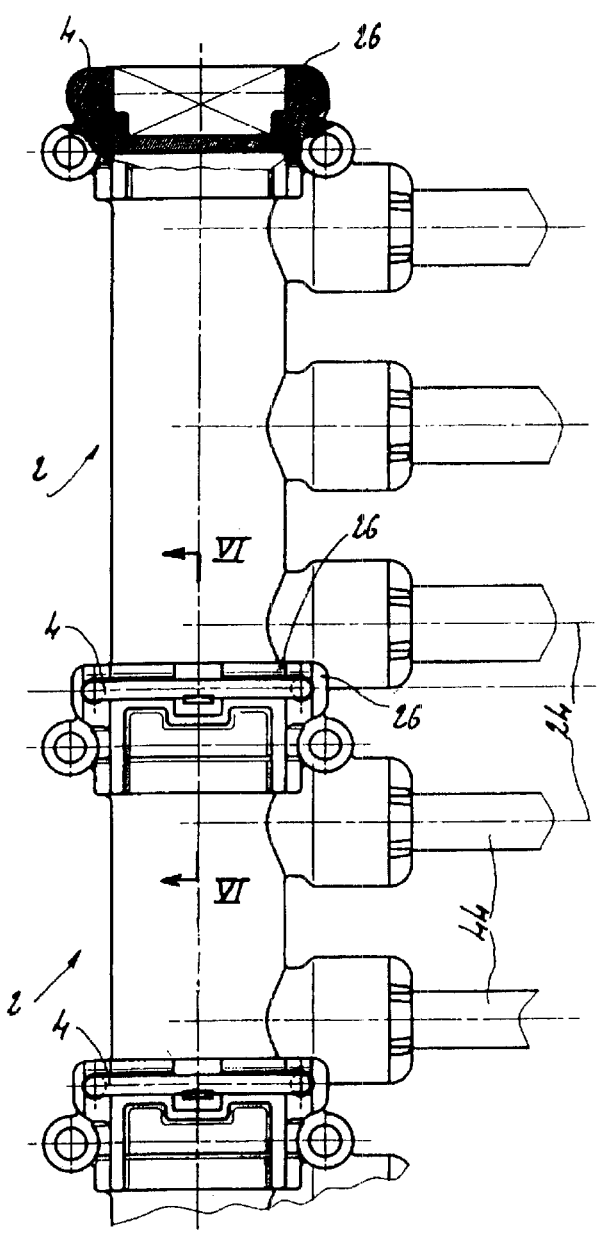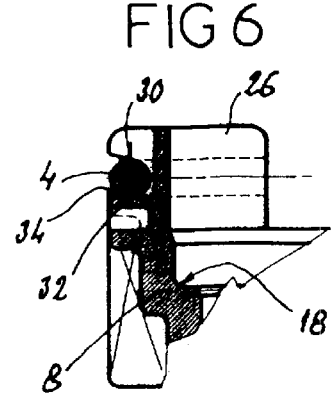

LIQUID DISTRIBUTION COLLECTOR MODULE AND FIXING SYSTEM FOR SAID MODULES

The present invention relates to a module for a manifold for a fluid main and to a fixing system for such modules.

The fields to which the invention relates are, essentially, the following fields: domestic hot and cold water, central heating, low-temperature heated floors and cooled floors. Of course, other areas in which a fluid, water but also other hydraulic fluids, is despatched to a manifold before being distributed to various parts of a hydraulic network are also covered.

To customize to suit the size of a heating network, for example, and therefore the number of radiators that are to be supplied, it is known practice for manifolds to be produced in a modular way. Individual modules are then available, each of which is able to distribute water to one radiator, or modules with two or three outlets. By joining such modules together, it is possible to customize to suit any scenario as regards the number of outlets needed.

The modules used to produce a manifold are in the form of a tubular component running along a first axis and one or more radial outlets are provided in the wall of this module.

To join several modules together, these modules are placed one beside the next and mechanically connected together. There are several systems in existence for fixing modules together.

A first system consists in providing each module with longitudinal bores. The modules are then assembled by aligning the longitudinal bores and by passing a threaded rod into each set of aligned longitudinal bores. At the two ends of the set of modules, these modules are clamped together using the threaded rods.

Another fixing system consists in making blind bores at the periphery of each end of a module. Two adjacent modules are then joined together by placing two blind bores one beside the other and by placing a small clip in each pair of two adjacent blind bores, each clip then connecting the two modules. By fitting the clips in this way all around the two modules that are to be connected, the latter are joined together. The clips used here run longitudinally with respect to the axis of the manifold.

These two fixing systems have disadvantages. In the first system, correct sealing between the modules is achieved by clamping these modules together. If, therefore, the fitter tightens excessively or inadequately during clamping, there are risks of leakage when the installation is in operation. The second connecting system has the disadvantage that it is necessary to have access to all the faces of the manifold in order to join it together adequately.

It is an object of the present invention to provide a module and a fixing system for such modules which do not have the abovementioned disadvantages. One object of the invention is therefore to provide a module and a fixing system that make it possible to guarantee good sealing between two adjacent modules. Advantageously, two adjacent modules will be joined together easily, even when the manifold has to be situated it a place which is not very accessible.

To this end, the invention proposes a module for a manifold for a fluid main, comprising a tubular body extending along a first axis and in which at least one radial outlet is made.

According to the invention, the module has, at one end, a female end piece and at its other end a corresponding male end piece, and bores extending in a plane approximately perpendicular to the first axis are provided on each side of the module at each of its ends, so that when two modules are fitted one inside the other, the bores of one module align with the bores of the other module on each side of the assembly thus produced.

Thus, to join two modules together, all that is required is for them to be fitted one inside the other and locked in position by introducing into the aligned bores a part which acts as a pin on each side of the assembly formed. Advantageously, the bores made on each side of a module are parallel. In this way, it is possible to secure two modules together with a U-shaped part in a single operation.

A module according to the invention preferably has a plane of symmetry containing the first axis and passing through a radial outlet. This makes it possible to access the module either from one side or the other.

In a preferred embodiment, the module according to the invention has, at the same end as the male end piece, on each side of the tubular body, a bore running in a plane perpendicular to the first axis, and at the same end as the female end piece, on each side of the tubular body, there are two aligned bores, distant from one another, so that when two adjacent modules are fitted one inside the other, each bore corresponding to a male end piece lies between the corresponding two bores of the female part of the other module. Excellent positioning of one module with respect to an adjacent module may thus be achieved. This here is a structure reminiscent of a hinge.

In order to correctly hold in place a part which acts as a pin introduced into aligned bores of modules according to the invention, a module advantageously comprises, at the same end as the female end piece, a retaining tab, arranged between the bores that lie on each side of the body and more or less tangential to these bores.

To ensure good sealing between two modules it is possible, for example, to provide an O-ring. In this case, the module has, for example, at the same end as the female end piece, and therein, a peripheral housing intended to accommodate such an O-ring.

As is already known in the case of modules of the prior art, it is advantageous to provide two opposed radial outlets on one module.

The invention also relates to a manifold for a fluid main which comprises at least two modules as described hereinabove.

Such a manifold advantageously comprises a U-shaped bracket, each branch of the U being plugged into a set of aligned bores lying on one side of the tubular body.

In order to be able to guarantee good sealing, a manifold according to the invention comprises, for example, an O-ring positioned around the male end piece of a module.

In any event, the invention will be clearly understood with the aid of the description which follows, with reference to the appended schematic drawing, which shows a preferred form of embodiment of modules according to the invention and of their fixing system.

FIG. 1 is an exploded perspective view showing two modules and a fixing bracket, FIG. 2 is a view in section on the section line II—II of FIG. 1 of a module according to the invention, FIG. 3 is a view in cross section, passing through a bracket for fixing together a set of two modules mounted on a mounting plate, FIG. 4 is a view from above of a set of modules according to the invention, joined together, FIG. 5 is a view from above of modules according to the invention having several outlets, and FIG. 6 is a view in section on a larger scale on the section line VI—VI of FIG. 5 of an embodiment detail of a module according to the invention.

FIG. 1 depicts two modules 2 according to the invention, a fixing bracket 4 and two O-rings 6.

Each module 2 essentially consists of a body 8 molded from synthetic material. This body 8 is a tubular body of axis 10 having two radial outlets 12. Water, or some other hydraulic fluid, arrives, for example, in the module 2 along the axis 10 and leaves via an outlet 12 perpendicular to this axis 10.

At one end (to the left in FIGS. 1 and 2) the tubular body 8 has a male end piece 14. The other end of the module 2 has a female end piece 16 intended to accommodate a male end piece 14 of another module 2. Formed at the female end piece 16 is a peripheral housing 18 intended to accommodate an O-ring 6.

At the same end as the male end piece 14, the tubular body 8 has two diametrically opposite lugs 20. These lugs 20 each have passing through them a bore 22 which runs in a plane perpendicular to the axis 10. The two bores 22 are parallel. They lie one on each side of the axis 10. It may be noted that the plane defined by the axes 10 and the axis 24 of the radial outlets 12 is a plane of symmetry of the module 2. A second plane of symmetry of this module contains the axis 10 and is perpendicular to the axis 24, At the other end of the tubular body 8, that is to say at the same end as the female end piece 16, the module 2 has two visors 26 which project longitudinally from the tubular body 8. A bore 28 is produced at each end of each visor 26. These bores 28 are parallel to the bores 22 made in the lugs 20. In addition, the spacing between two bores 28 of one and the same visor 26 is equal to the spacing between two bores 22 of two lugs 20. The visors 26 are arranged in such a way that the empty space left between them allows the passage of two lugs 20. Between two bores 28 of one and the same visor 26 there is a slot 30 intended to accommodate the bracket 4 as described later on. A retaining tab 32 is provided at the edge of this slot 30. It runs in a direction tangential to the bores 28.

The bracket 4 is a metal rod of circular cross section which has been bent into the shape of a U. The two branches of the U are parallel and separated from one another by the distance which separates two bores 28 of a visor 26. The diameter of the rod used to make the bracket 4 is suited to the diameter of the bores 28 and 22.

To join two modules 2 together, an O-ring 6, for example, is placed around a male end piece 14 of one module 2, then this male end piece 14 is introduced into the female end piece 16 of the second module. The two modules 2 are oriented in such a way that the lugs 20 of the first module fit in between the visors 26 of the second module. The position of the lugs 20 and of the bores 22 is such that the bores 22 of the first module are aligned with the bores 28 of the second module when the two module are correctly fitted one inside the other and when the O-ring 6 is in place in the housing 18 provided for this purpose, producing a good seal between the two modules. Once the bores 22 and 28 are aligned, the bracket 4 is introduced via its free ends into the bores. The bracket 4 is introduced until its base connecting the two branches fits into the slot 30 provided for that purpose. The tab 32 retains the bracket 4 in that position, The tab 32 is given a nib 34 (FIG. 6) to guarantee that it holds the bracket 4 firmly in the slot 30.

As can be seen in the drawing, each module 2 has a second pair of lugs in which bores 38 are made. These bores are parallel to the bores 22 and 28. They are intended to take a fixing screw for fixing the module to a support. FIG. 3 shows such an example of fixing. This figure is a cross section passing through a bracket 4 connecting two nodules 2. These two modules are arranged on a mounting plate 40. Two screws 42 passing through the lugs 361 allow the two modules 2 to be fixed to the mounting plate 40.

FIG. 4 shows a set of four modules joined together and forming a manifold. The latter has four outlets for fluid. Connected to each of these outlets is a pipe 44. Each module 2 has two outlets 12. One of these outlets takes a pipe 44 while the other can take a device such as, for example, a manual control, a thermostatic control, a flow meter, etc.

The description given hereinabove relates to modules intended to be connected to just one receiving member such as, for example, a radiator or a heated or cooled floor circuit. It is also possible, with a module according to the invention, to use one and the same module to supply two or more receiver members. FIG. 5 shows two modules joined together, one of the modules supplying two receiving members and the other supplying three.

A manifold produced with modules according to the invention has many advantages. As emerges from the above description, all that is required is for the two modules to be fitted one inside the other and for a bracket to be fitted in order to hold them in place. The fitter needs no tools, not even a screwdriver, in order to assemble the manifold.

Once the bracket is in place, the design of the product guarantees good sealing by virtue of the O-ring. The fitter has no influence over this seal. It is not possible to overcompress it or to fit it too loosely.

It is possible to operate quickly on an existing installation equipped with a manifold module according to the invention, simply by removing the bracket and parting the modules.

The design of the modules according to the invention makes it possible to have outlets which are opposed from one manifold to the next. It is therefore possible, at the time of assembly, to make best use of the space available.

When the manifold needs to be mounted in a relatively confined space, it is possible to fit the bracket from one side or from the other side. This is because the module is symmetric and therefore allows the bracket to be fitted from two opposite directions.

Finally, a manifold according to the invention can easily be fixed directly to the floor or to a wall. Other mountings are, of course, possible.

As goes without saying, the invention is not restricted to the preferred form of embodiment described hereinabove by way of nonlimiting example on the contrary, it encompasses all variations thereof that fall within the scope of the claims which follow.

For example, it is thus not compulsory,to have, on each side of the module, a bore which is sandwiched between two other bores. One could, for example, have just one bore on each side of the module, both at the male end piece end and at the female end piece end. The number of bores can be chosen at will.

The use of an O-ring to make the seal is optional. Other types of seal may of course also be used. It is even possible to envision sealing that does not involve an added seal.

A module according to the invention is advantageously symmetric. However, it would not be departing from the scope of the invention if there were to be a module which did not have a plane of symmetry.

Means other than a retaining tab may be envisioned for holding the bracket in place. Nor is this bracket indispensable in the invention; one could simply have two rods keeping the bores aligned on each side of the tubular body of the module. The rods used could then for example be a cylindrical split pin, a bolt or the like.

What is claimed is:

1. A module (2) for a manifold for a fluid main, comprising a tubular body (8) extending along a first axis (10) and in which at least one radial outlet (12) is made, characterized in that the module (2) has at one end a female end piece (16) and at its other end a corresponding male end piece (14), and in that bores (22, 28) extending in a plane approximately perpendicular to the first axis (10) are provided on each side of the module (2) at each of its ends, so that when two modules (2) are fitted one inside the other, the bores (22) of one module align with the bores (28) of the other module on each side of the assembly thus produced.

2. The module as claimed in claim 1, characterized in that the bores (22, 28) produced on each side of the module (2) are parallel.

3. The module as claimed in claim 1, characterized in that it has a plane of symmetry containing the first axis (10) and passing through a radial outlet (12).

4. The module as claimed in claim 1, characterized in that it has, at the same end as the male end piece (14), on each side of the tubular body (8), a bore (22) running in a plane perpendicular to the first axis (10), and in that, at the same end as the female end piece (16), on each side of the tubular body (8), there are two aligned bores (28), distant from one another, so that when two adjacent modules (2) are fitted one inside the other, each bore (22) corresponding to a male end piece (14) lies between the corresponding two bores (28) of the female part (16) of the other module.

5. The module as claimed in claim 1, characterized in that it comprises, at the same end as the female end piece (16), a retaining tab (32), arranged between the bores (28) that lie on each side of the body (8) and more or less tangential to these bores.

6. The module as claimed in claim 1, characterized in that, at the same end as the female end piece (16) and therein, it has a peripheral housing (18) intended to house an O-ring (6).

7. The module as claimed in claim 1, characterized in that it has two opposed radial outlets (12).

8. A manifold for a fluid main, characterized in that it comprises at least two modules (7) as claimed in claim 1.

9. The manifold as claimed in claim 8, characterized in that it further comprises a U-shaped bracket (4) each branch of the U being plugged into a set of aligned bores (22, 28) lying on one side of the tubular body (8).

10. The manifold as claimed in claim 8, characterized in that it further comprising O-ring (6) positioned around the male end piece (14) of a module.

* * * * *